Oct. 9, 1951  L. J. BEHR  2,570,908
INDICATOR TO BE WORN ON THE HANDS
WHILE LEARNING TO TYPEWRITE
Filed Dec. 28, 1949
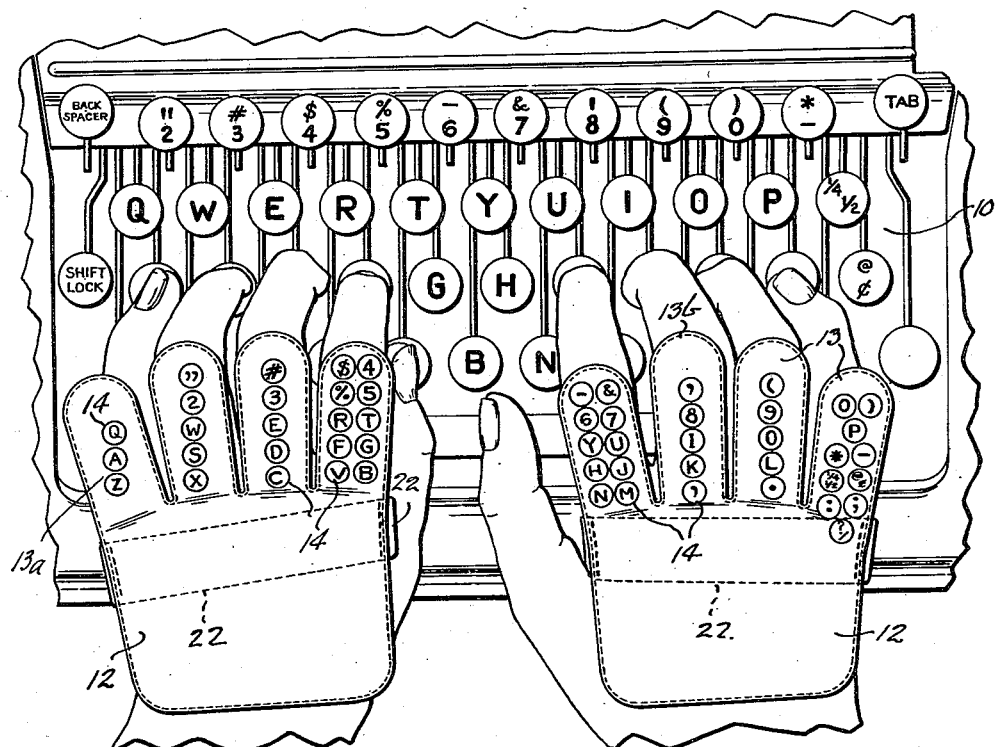
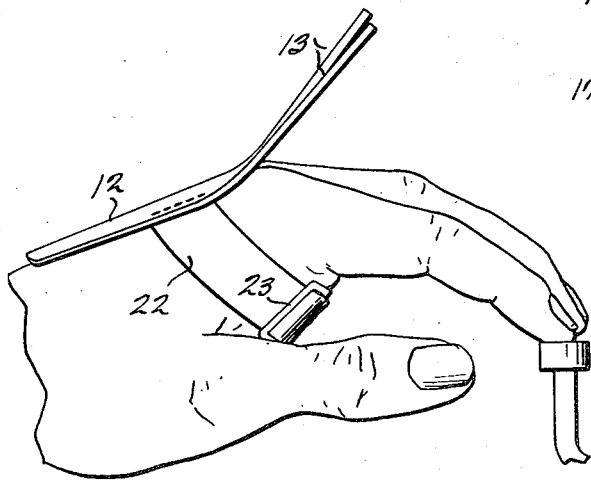
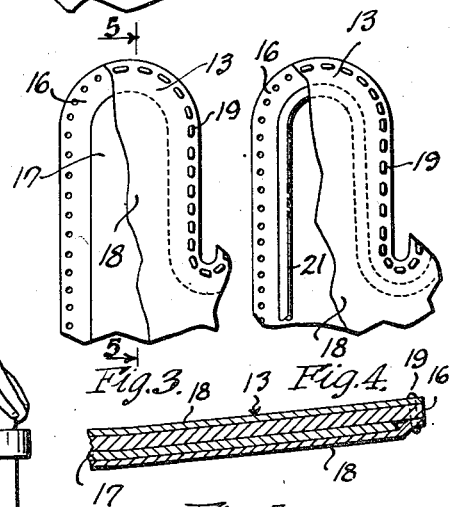
Fig.1.
Fig.2.
Fig.3. Fig.4.
Fig.5.
Inventor
Leo J. Behr
By Wooster & Davis Attorneys Patented Oct. 9, 1951

2,570,908

UNITED STATES PATENT OFFICE 2,570,908

INDICATOR TO BE WORN ON THE HANDS WHILE LEARNING TO TYPEWRITE

Leo J. Behr, Bridgeport, Conn.

Application December 28, 1949, Serial No. 135,461

5 Claims. (Cl. 35—5)

This invention relates to devices intended to be used for self-instruction in learning a variety of manual operations, such as touch typing, teletyping, linotyping, and the like, wherein the different fingers of the operator are normally employed to actuate different specific elements such, for example, as typewriter keys, or the like. Although the invention is hereafter described for use in learning the touch system of typing, it will be apparent that it is equally well adapted to and useful in numerous other fields.

An object of the invention is to provide an improved guide for indicating the action of the different fingers in a given operation, constructed so as to be easily secured on the hand, and arranged, when so secured, to provide a chart or guide showing the function of each finger in the given operation.

A further object is to provide a guide for the purposes specified arranged to be worn on the user's hand without any uncomfortable heating effect and without impeding the use of the fingers in any way.

A still further object is to provide a guide for self-instruction in learning the touch system of typing, which, when in position on the back of the hand will show the correct keys to be struck by each finger as well as the positions of the keys relative to the actuating finger.

A still further object is to provide a guide of the above type of such construction as to fit different sizes of hands without requiring adjustment of any kind. This permits the use of a single size of guide for all users and minimizes the cost of manufacture.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a plan view of a guide showing one embodiment of the invention especially arranged for use in learning the touch system of typing;

Fig. 2 is a side elevation of the guide illustrated in Fig. 1, showing it in place on a user's hand and illustrating the construction by which the hand and fingers are left entirely unimpeded;

Fig. 3 is a plan view on an enlarged scale, partly broken away, showing certain details of construction;

Fig. 4 is a similar view showing an alternative construction, and

Fig. 5 is a section on the line 5—5 of Fig. 3.

The present invention comprises a self-instructor constructed and arranged to be attached to the hand or hands of the user, depending upon whether one or both hands are to be employed in the operation. In learning typing, for example, a finger guide is provided for each hand. Each guide is formed with a plurality of extensions which overlie the fingers, one extension being positioned above each finger. Each extension has indicia showing what keys or the like should be actuated by the associated finger. For example, when, as in the illustrated embodiment, the device is intended for use in learning the touch system of typing, the indicia on all the extensions combined comprise a replica of a typewriter keyboard, the indicia on each extension indicating the keys to be struck by the associated finger. The device is designed to be easily slipped on and off the hand and when in position thereon is so formed as to permit free and unhindered use of the fingers, at the same time permitting an unobstructed view of the actual typewriter keyboard.

The illustrated embodiment is shown in connection with a typewriter keyboard 10 of standard arrangement. Inasmuch as both hands are employed in typing, two guides are used, one to be secured to each hand. Each includes a body portion 12 arranged to be applied to the back of the user's hand, and provided with a plurality of finger-like extensions 13. One extension overlies each finger of the user, and each extension bears indicia 14 which indicate the proper keys to be struck by the associated finger. For example, the extension 13a which overlies the little finger of the left hand indicates the keys Q, A and Z which are normally actuated by that finger in touch typing. Likewise, the extension 13b for example, which overlies the second finger of the right hand indicates keys for the apostrophe, the numeral 8, the letters I and K, the interrogation mark, and the comma, each of which is normally actuated by that finger.

The indicia can be applied to the extensions in any desired manner, by printing, lithographing, or the like. Also, the individual extensions are so formed as to permit an unobstructed view of the keyboard and do not interfere in any way with the operation of the fingers. As illustrated, this is accomplished by forming each extension 13 so that it is considerably shorter than the associated finger of the user, preferably terminating at approximately the middle joint of the finger.

The invention contemplates forming the body member and the extensions of flexible material which is preferably such that it can be bent into any suitable position and will remain in such position until intentionally changed. As shown in Figs. 3 and 5, each body portion 12 and extension 13 includes a layer 16 of fibre or similar flexible material cut to form the body portion 12 and each extension 13 as a single integral piece.

A stiffening layer 17, preferably of thin metal which may, for example, be from .005" to .010" thick, is secured to the fiber in any suitable manner, as by an adhesive. The indicia characters are preferably applied directly to the fiber layer 16, and a thin protective cover 18 of transparent material is applied over both the top and bottom surfaces of the body member and extensions. The covering material may, for example, be a thin layer of transparent plastic, such as a vinyl chloride or the like, secured to the fiber by any suitable means, such as stitching 19.

As shown in Fig. 4, the fiber layer is stiffened by a loop of metallic wire 21 secured to each extension and a portion of the body member to hold the extensions in adjusted positions. Like the layer of metal, the wire stiffening is covered by the layer 18 of transparent protective plastic.

In use, the body members 12 are secured in position on the backs of the respective hands with the extensions projecting over the proper fingers of the user. For this purpose, each body member is provided with a securing means such as the elastic band 22 illustrated in Fig. 2. Each band has an adjusting clip 23 of conventional form for varying its effective length and to adapt the guide to hands of different size. When so positioned on the hand, it will be apparent that the indicia on the different extensions correctly indicate to the user the proper keys to be struck by the different fingers. As a result, learning the touch system of typing is greatly expedited and simplified. The invention is so formed as not to cut off the circulation of air around the hand, so that it can be worn for extended periods without heating the hands. At the same time it does not interfere in any way with the normal use thereof in typing.

It will be apparent that the invention is not limited to use in typing, but is equally well adapted for self-instruction in other manual operations, such, for example, as linotyping, teletyping, and similar types of activities. Where such activities require indicia for indicating the use of the thumb, an additional extension can be provided on each body portion for this purpose.

The invention can be variously modified and adapted within the scope of the appended claims.

Having thus set forth the nature of my invention, I claim:

1. An article of manufacture for self-instruction in manual operations, comprising a member adapted to be secured to the back of a user's hand including separate extensions for overlying at least a portion of the fingers employed in the operation, indicia on each extension for instructing the user as to the purpose and manner of using the associated finger, and means holding said extensions in position to permit unhindered movement of the user's fingers.

2. A finger guide for self-instruction in a predetermined manual operation comprising a body member having a plurality of indicia-bearing extensions adapted to overlie the fingers of a user, including a flexible layer of fibrous material bearing said indicia, and a flexible metallic member secured to said fibrous material and adapted to hold said fibrous material in adjusted position to which it may be flexed to leave the fingers of the user free for unhindered movement.

3. A finger guide for self-instruction in a determinate manual operation comprising a body member having a plurality of indicia-bearing extensions adapted to overlie the fingers of a user, including a flexible layer of fibrous material bearing said indicia, a flexible metallic layer secured to said fibrous material and adapted to hold it in adjusted position to which it may be flexed to leave the fingers of the user free for unhindered movement, and a protective layer of substantially transparent material forming the surface of said extensions.

4. A finger guide for self-instruction in a predetermined manual operation comprising a body member having a plurality of indicia-bearing extensions adapted to overlie the fingers of a user, including a flexible layer of fibrous material bearing said indicia, and a flexible wire secured to said extensions and adapted to hold said fibrous material in adjusted position to which it may be flexed to leave the fingers free and unhindered.

5. A finger guide for self-instruction in a predetermined manual operation comprising a body member, means for mounting the body member over the back of a hand of a user, said member having a plurality of indicia-bearing extensions to overlie fingers of said hand, and said extensions each including a flexible metallic member adapted to hold the extension in adjusted position to which it may be flexed to leave the fingers free for unhindered movement.

LEO J. BEHR.

REFERENCES CITED

The following references are of record in the file of this patent:

UNITED STATES PATENTS

| Number | Name | Date |
|---|---|---|
| 623,966 | Barkley | May 2, 1899 |
| 1,402,319 | Segesser | Jan. 3, 1922 |
| 2,154,478 | Smith | Apr. 18, 1939 |